United States Patent
Zischka et al.

(10) Patent No.: US 12,077,125 B2
(45) Date of Patent: Sep. 3, 2024

(54) AIRBAG DEFLATION DEVICE, AND VEHICLE SEAT

(71) Applicant: ZF AUTOMOTIVE GERMANY GMBH, Alfdorf (DE)

(72) Inventors: Gerd Zischka, Schwäbisch Gmünd (DE); Jürgen Scherr, Waldstetten (DE); Rolf Ruckdeschel, Heldenstein (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 42 days.

(21) Appl. No.: 17/609,866

(22) PCT Filed: May 5, 2020

(86) PCT No.: PCT/EP2020/062419
§ 371 (c)(1),
(2) Date: Nov. 9, 2021

(87) PCT Pub. No.: WO2020/229223
PCT Pub. Date: Nov. 19, 2020

(65) Prior Publication Data
US 2022/0227328 A1    Jul. 21, 2022

(30) Foreign Application Priority Data

May 10, 2019 (DE) .................. 10 2019 112 290.2

(51) Int. Cl.
*B60R 21/239* (2006.01)
*B60R 21/207* (2006.01)
*B60R 21/264* (2006.01)

(52) U.S. Cl.
CPC .......... *B60R 21/239* (2013.01); *B60R 21/207* (2013.01); *B60R 21/264* (2013.01); *B60R 2021/2395* (2013.01)

(58) Field of Classification Search
CPC .......... B60R 21/239; B60R 2021/2395; B60R 2021/2765; B60R 21/264; B60R 2021/26076
See application file for complete search history.

(56) References Cited

U.S. PATENT DOCUMENTS

| | | | |
|---|---|---|---|
| 6,814,732 B2 | 11/2004 | Schaer | |
| 7,083,192 B2 * | 8/2006 | Fischer | ............. B60R 21/276 280/739 |

(Continued)

FOREIGN PATENT DOCUMENTS

| | | | | |
|---|---|---|---|---|
| DE | 4200833 A1 * | 7/1992 | ............ | B60R 21/16 |
| DE | 19704501 A1 * | 8/1997 | ........... | B60R 21/015 |

(Continued)

OTHER PUBLICATIONS

Faigle, DE-19704501-A1, Aug. 1997, Machine Translation of Specification.*

(Continued)

*Primary Examiner* — Amy R Weisberg
*Assistant Examiner* — Matthew Joseph Ganci
(74) *Attorney, Agent, or Firm* — Tarolli, Sundheim, Covell & Tummino LLP

(57) ABSTRACT

An airbag venting device (10) comprises a housing (24) which includes a first flow orifice (18) facing away from the airbag (12) and a second flow orifice (20) facing the airbag (12). The housing (24) has an axial total length (26), the first flow orifice (18) has a first axial opening length (34) and the second flow orifice (20) has a second axial opening length (34). An adjustable closure element (22) assigned to the housing (24), in an open position, releases at least one of the two flow orifices (18, 20). An actuator device (30) interacts with the closure element (22) to release and/or to close the flow orifice (18, 20), and, in doing so, the axial total length (26) of the housing (24) is less than 3 times the length of the (Continued)

longer axial opening length (34) of the two flow orifices (18, 20).

19 Claims, 7 Drawing Sheets

(56) References Cited

U.S. PATENT DOCUMENTS

| | | | | |
|---|---|---|---|---|
| 7,618,059 | B2* | 11/2009 | Hall | B60R 21/2338 280/739 |
| 2005/0005805 | A1 | 1/2005 | Schmid | |
| 2006/0061076 | A1* | 3/2006 | Webber | B60R 21/276 280/736 |
| 2007/0075537 | A1* | 4/2007 | Rust | B60R 21/276 280/739 |
| 2009/0091108 | A1* | 4/2009 | Seo | B60R 21/26 280/733 |
| 2009/0102170 | A1* | 4/2009 | Lee | B60R 21/2171 280/741 |

FOREIGN PATENT DOCUMENTS

| | | | |
|---|---|---|---|
| DE | 19736243 A1 | 3/1998 | |
| DE | 19837927 A1 | 3/2000 | |
| DE | 19949350 A1 | 11/2000 | |
| DE | 19958572 C1 | 1/2001 | |
| DE | 19952967 C1 | 2/2001 | |
| DE | 102005055414 A1 | 5/2006 | |
| DE | 102005020053 A1 * | 11/2006 | ......... B60R 21/2338 |
| DE | 102005043706 A1 | 1/2007 | |
| DE | 102007060881 A1 | 4/2009 | |
| DE | 102012001165 A1 | 7/2013 | |
| JP | 2010184559 A * | 8/2010 | ........... B60R 21/261 |
| JP | 2019214358 A * | 12/2019 | ............. B60R 21/26 |
| KR | 20100055217 A * | 5/2010 | ............. B60R 21/16 |
| WO | 2020/030780 A1 | 2/2020 | |

OTHER PUBLICATIONS

Hillmann, JP-2019214358-A, Dec. 2019, Machine Translation of Specification.*
Hanano, JP-2010184559-A, Aug. 2010, Machine Translation of Specification.*
Debler, DE-102005020053-A1, Nov. 2006, Machine Translation of Specification.*
Kwon, KR 20100055217 A, May 2010, Machine Translation of Specification.*
Kraft, DE 4200833 A1, Jul. 1992, Machine Translation of Specification.*
PCT Search Report for corresponding PCT International Application Serial No. PCT/EP2020/062419, mailed Jul. 6, 2020, pp. 1-5.

* cited by examiner

AIRBAG DEFLATION DEVICE, AND VEHICLE SEAT

RELATED APPLICATIONS

This application is a U.S. National Stage Application filed under 35 USC 371, claiming priority to Serial No. PCT/EP2020/062419, filed on 5 May 2020; which claims priority from German Patent Application DE 10 2019 112 290.2, filed 10 May 2019, the entireties of which are hereby incorporated herein by reference.

BACKGROUND OF THE INVENTION

The invention relates to an airbag venting device for controlling an internal pressure of an airbag of a vehicle occupant safety system and to a vehicle seat comprising an airbag venting device.

In vehicles, airbags are intended to protect vehicle occupants, in the case of extremely strong decelerations or lateral accelerations, as they occur, e.g., during crash, from impacting on hard vehicle components, such as a steering wheel or a vehicle pillar. At the same time, the forces acting on the vehicle occupant in the case of impact are reduced thanks to the airbag, as the vehicle occupant is decelerated by the inflated airbag. A gas generator assigned to the airbag generates inflation gas to inflate the airbag so that the airbag deploys.

However, when the vehicle occupant is cushioned by the airbag, the airbag may happen to be inflated too strongly and thus to be too hard. In so far, it is known from prior art to control the hardness and, resp., the gas pressure of the airbag by the airbag discharging inflation gas, upon impact of a vehicle occupant, through an opening and thus reducing its internal pressure.

In modern vehicles, airbags are placed not only in the area of the instrument panel or inside the steering wheel but also in other areas of the vehicle. For example, for protection from a side impact, airbags are arranged in the door lining or in the transition area to the roof liner or laterally in the seat itself.

Due to different influences, during crash a softer or harder airbag may be of advantage. The influences include, for example, the angle of impact, the impact force, the type of impact (punctual or full-surface) or characteristics of the vehicle occupants such as a body height or body weight or the vehicle seat position.

In common airbags, the internal pressure of the airbag is discharged through a so-called "vent hole". Via the vent hole, the internal pressure cannot be adapted to the different influences, however, depending on the situation. The internal pressure initially has a particular value that reduces more quickly or more slowly in response to the impact force of the vehicle occupant, as the inflation gas is pressed through the vent hole.

SUMMARY OF THE INVENTION

Therefore, it is already known to control the internal pressure of an airbag via a so-called "Active Adaptive Vent" device (AAV device) in which the venting of the airbag is actively controlled and, resp., adapted. Via a plurality of various sensors, different parameters (e.g., impact or vehicle occupant characteristics) having an influence on the required internal pressure inside the airbag, in particular the timing of the internal pressure, are detected. Said parameters are processed in a controller of the vehicle, whereupon a vent opening of the AAV device is opened from a predetermined time depending on the required internal pressure.

In particular in AAV devices used in a vehicle seat, the construction size is very important, as there the space is very limited.

It is the object of the invention to provide a reliable, safe and space-saving, particularly space-optimized, airbag venting device.

The object is achieved, according to the invention, by an airbag venting device comprising the following characteristics. The airbag venting device includes a housing having a first flow orifice faced away from the airbag and a second flow orifice facing the airbag, the housing having an axial total length, the first flow orifice having a first axial opening length and the second flow orifice having a second axial opening length. Further, the airbag venting device comprises an adjustable closure element assigned to the housing which, in a closing position, closes and, in an open position, releases at least one of the two flow orifices. In addition, the airbag venting device comprises an actuator device provided at a front end of the housing. The actuator device interacts with the closure element to release and/or close the flow orifice. In the airbag venting device according to the invention, the axial total length of the housing is less than 3 times the length of the longer axial opening length of the two flow orifices. In particular, the axial total length of the housing of the airbag venting device is maximally 2.5 times the length of the longer axial opening length of the two flow orifices.

In this way, the airbag venting device according to the invention requires little space so that it can be integrated in a vehicle seat.

Accordingly, the airbag venting device is an active and adaptive airbag venting device, i.e., an AAV device.

The space-optimized structure having a shorter the total length than known active and adaptive airbag venting devices enables, even when less space is given, a vehicle occupant safety system which comprises an active and adaptive airbag vent system as well as an airbag to be integrated in a vehicle seat. In particular, this is enabled by the fact that the axial total length of the housing of the airbag venting device is less than 3 times, especially less than 2.5 times, the length of the axial opening length of the first or second flow orifice configured to be longer in the axial direction.

The closure element may be configured to simultaneously close, in the closing position, both flow orifices and to simultaneously release, in the open position, both flow orifices so as to provide a flow path via which the inflation gas may flow out of the airbag.

Alternatively, the closure element can close only one flow orifice in its closing position and can release only one flow orifice in its open position. The other flow orifice then is permanently released so that, in the open position of the closure element, the flow path is provided.

In one embodiment, the two flow orifices, are opposed, especially congruently, to each other. Accordingly, the two flow orifices may have an identical shape, meaning that the two flow orifices have an identical width and axial opening length. Thus, a flow resistance of a gas flow can be minimized by the two flow orifices, i.e., the flow path.

The flow orifices may also be offset against each other or may be oriented differently relative to each other, however. In this way, inter alia the inflation gas exiting the airbag can be specifically directed, if this is required due to the mounting position.

Another embodiment provides the actuator device and the closure element to interact such that the closure element rotates and/or is axially adjusted due to activation of the actuator device. Thus, the closure element is moved to its open position and, in doing so, at least one flow orifice is exposed through which then the flow path is established.

In particular, by rotating the closure element, a rotation of the closure element in the circumferential direction of the housing or a pivoting movement of the closure element at the housing is designated.

A rotary movement hence comprises both a rotational movement and a pivoting movement.

An axial adjustment is especially meant to be an axial displacement of the closure element in the axial direction, i.e., a translational movement.

One embodiment of the invention provides the actuator device to comprise a transfer member which interacts with the closure element and/or via which the actuator device is at least partially in mechanical contact with the closure element, in particular protrudes at least partially into the closure element. The transfer member is operatively arranged between the actuator device and the closure element. By the transfer member, the force generated by the actuator device and, resp., a pulse generated by the actuator device can be transferred specifically to the closure element.

Accordingly, the transfer member may be continuously in mechanical contact with the closure element or may mechanically contact the closure element only when the actuator device is activated.

The transfer member may be continuously in mechanical contact with the actuator device or may be operatively connected to the actuator device in any other way.

Alternatively, the actuator device can pneumatically actuate the closure element, wherein, in accordance with these embodiments of the present invention, the term "pneumatically" generally describes the use of a gas or air as pressure medium to carry out mechanical work. In other words, in such embodiment a transfer medium, viz. a gas, such as air or the gas forming upon activation of a pyrotechnic igniter, is present.

According to one aspect, the closure element is a hollow, especially cylindrical, piston that is supported to be axially movable in the housing and/or has a piston opening on an end face assigned to the actuator device. Such closure element is easy to manufacture and, in its closing position, is capable of reliably closing both flow orifices with little expenditure of material.

Of preference, the piston is moved into its open position pneumatically and thus using a gas a pressure medium, for example by a gas expansion generated by a pyrotechnic igniter. The hollow piston receives a major part of the expanded gas as well as possible particles provided therein so that the latter preferably do not exit via one of the flow orifices. The pyrotechnic igniter preferably is a micro gas generator which are known, for example, from the field of seatbelt tensioning systems.

In particular, the housing may be constricted (e.g., by roller-burnishing) in an area into which the piston is moved in its open position, or may include a component by which the piston is maintained in its open position.

In another embodiment, the closure element is equally configured as a hollow, especially cylindrical, piston that is supported to be axially movable in the housing and/or has a piston opening at an end face turned away from the actuator device. The end face of the piston facing the actuator device is configured to be closed and thus has no opening. In such embodiment, the piston can be driven by a mechanical actuator device and/or a pneumatic actuator device. The piston is configured, by suitable material selection and/or a suitable design of the geometry and/or the structure of the cylinder wall of the piston such that it is a deformable element adapted to be deformed on a front wall of the housing opposed to the actuator device. Consequently, the piston, in particular the cylinder wall of the piston, is deformed on the opposite front wall of the housing and is compressed, especially collapsed, to a fraction of the original length. The piston, in particular the cylinder wall of the piston, may be made from a polymeric or metallic material, for example.

The total length of the housing of the active and adaptive airbag venting device thus can be designed to be only slightly longer than the longer axial opening length of the first and, resp., second flow orifice. In particular, the construction size, particularly the total length, of the housing can be strongly reduced in this way so that the total length is especially merely 1.5 times the length of the longer axial opening length of the two flow orifices.

In another embodiment, the movement is carried out by a pneumatic actuator device by means of gas explosion and is transferred to the closure element via a transfer member. For this purpose, the actuator device may be in the form of a pyrotechnic igniter, for example, in particular of a micro gas generator. In the closed position, between the actuator device and the transfer member a gas expansion chamber sealed against the environment is present. The transfer member comprises a push rod and a pressure plate, wherein the gas expansion chamber is sealed above the pressure plate which, for this purpose, preferably has outer dimensions corresponding to the inner dimensions of the housing of the airbag venting device. On the side of the pressure plate remote from the actuator device, the push rod of the transfer member is mounted as an elongate link to the closure element configured as a hollow, especially cylindrical, piston. The push rod substantially has a length about which the piston must be moved to reach the open position in which the flow orifices are completely opened. By the activation, especially the ignition of the actuator device, an excess pressure is generated in the gas expansion chamber by the gas generated by the pyrotechnic igniter, and the transfer member is moved away from the actuator device by the gas expansion. Thus, the piston is moved via the push rod toward the front wall of the housing of the airbag venting device remote from the actuator device. The force acting from the transfer member to the piston causes the latter to be moved to the open position, wherein the cylinder wall of the piston, which is especially hollow and thin-walled, is compressed and/or deformed upon impacting on the front wall of the housing remote from the actuator device. Consequently, the piston, especially the cylinder wall of the piston, in this embodiment is equally deformed on the opposite front wall of the housing and is compressed, especially collapsed, to a fraction of the original length. The deformability/compressibility of the piston can be achieved by suitable material selection and/or suitable design of the geometry and/or the structure of the cylinder wall of the piston. In a preferred embodiment, the piston, in particular the cylinder wall of the piston, is made from a polymeric or metallic material.

In another embodiment, the airbag venting device comprises a transfer member having a funnel-shaped channel that protrudes through the piston opening into the piston. Thus, the force generated by the actuator device can be directed specifically into the piston. In particular, the funnel-shaped channel acts as a nozzle.

In this embodiment, too, the piston is preferably pneumatically moved to its open position by a gas expansion generated by the actuator device. Due to the transfer member, the pressure generated by the gas expansion is decreased more slowly, resulting in longer pressurization of the piston with pressurized gas, whereby the piston is actively pressurized into its open position for a longer period of time.

In general, for this purpose the piston may include, on its side facing the actuator device, an end through which the funnel-shaped channel extends. The end may be an end plate which is inserted at the end side, for example, into the body configured as a hollow.

In particular, the transfer member is sealed to the actuator device and/or sealingly abuts against the piston opening. Thus, almost the entire (pneumatic) force generated by the actuator device can be directed into the piston. In addition, possible particles present in the expanded gas can be preferably received in the piston and/or in the transfer member. The pressurized gas can be generated, for example, by ignition of a pyrotechnic igniter, such as a micro gas generator.

In another embodiment, the closure element is pivotally mounted on the outside of the housing, wherein the closure element in the open position is folded away from the housing to release either of the two flow orifices, particularly the second flow orifice. In other words, the closure element swivels away from the housing, when it is transferred to its open position. Accordingly, no area needs to be provided in the housing for the closure element into which the closure element is moved into its open position. Consequently, the size, especially the total length, of the housing can be further reduced so that it has merely 2 times, especially 1.5 times, the length of the longer axial opening length of the two flow orifices.

Of preference, the closure element is folded in the direction of the airbag into its open position. This means that the closure element is pivoted into the (inflated) airbag. The force applied to pivot the closure element then must be greater than the force emanating from the internal pressure.

One aspect provides the transfer member to comprise a toothing that interacts with a mating toothing of the closure element so that an axial movement of the transfer member causes a pivoting movement of the closure element. Thus, the force of the actuator device can be transmitted to the closure element. The toothing and the mating toothing consequently translate an axial movement of the transfer member into a pivoting movement of the closure element. In other words, the toothing and the mating toothing represent a translation.

The transfer member may be in contact with the actuator device or may be pressurized indirectly by the actuator device.

The transfer member is preferably maintained, after activation of the actuator device, in the position in which the closure element is in its open position. This helps ensure that the closure element does not return, during pressure reduction of the airbag, to its closing position, in particular when the transfer member and the closure element are still operatively connected to each other even after activation of the actuator device.

Alternatively, the transfer member may be provided to comprise a toothing that interacts with a mating toothing of the closure element so that a rotary movement of the transfer member causes a pivoting movement of the closure element. For this purpose, the transfer member may be especially designed as a worm of a worm gear. Thus, the force of the actuator device comprising, for example, an electric motor as an actuator can be transmitted to the closure element. The worm gear then translates a rotary movement of the transfer member into a pivoting movement of the closure element.

Another advantage of such embodiment comprising an actuator device including an electric motor resides in the fact that also intermediate positions of the closure element are enabled in this way so that the flow orifices are only partially released (partial open position). In addition, the closure element can be enabled to be transferred to the open position in predefined steps.

According to another embodiment, the closure element is curved and is rotatably supported inside or outside the housing. In this case, too, the total length of the housing can be further reduced so that it is merely 2 times, especially 1.5 times, the longer axial opening length of the two flow orifices.

If the housing takes a circular-cylindrical shape and the closure element is rotated to release the at least one flow orifice, the closure element is curved so as to be moved along the circumferential surface of the housing, especially adjacent to the inside or to the outside of the circumferential surface, so that, in the closing position, no gas or at least only small amounts of gas can escape via the flow orifice.

The closure element may be directly connected to the actuator device. The actuator device may comprise as an actuator, for example, an electric motor, especially a servo motor or a step motor, which rotates the closure element about a predetermined angle and ensures the closure element to be maintained in its open position. In such embodiment, a control or initiation of a rotary movement of the closure element may be provided to be governed/controlled by the actuator device, in particular by the actuator of the actuator device, via a controller. Via the controller, the flow orifice can be opened in previously defined steps so as to enable control of the cross-section of the flow orifice. For example, particular semi-open positions, such as a rotation of the closure element of 5° at 5 msec and 45° at 25 msec, may be provided to be enabled at particular times after activation of the actuator device based on a situation of restraint depending on occupant-dependent and/or crash-dependent parameters. Such time-dependent semi-open positions are preferably stored in the controller in the form of a matrix in which semi-open positions at specific times are assigned to occupant-dependent and/or crash-dependent parameters. In addition, such actuator device also allows the closure element to be transferred into the closed position again so that the flow orifice can be completely closed again.

Alternatively, the closure element may also be connected to the actuator device via a transfer member.

One aspect provides that a guiding extension projects at the transfer member in the direction of the closure element, the guiding extension interacting with the closure element so that an axial movement of the transfer member causes a rotary movement of the closure element. Such a combination of transfer member and closure element may help save much space, as inside the housing no area for the closure element into which the closure element is moved to its open position needs to be provided. Moreover, the closure element may be provided to move merely inside the housing so that, in the direct exterior of the housing, no installation space needs to be provided for a component of the airbag venting device moving therein.

In one embodiment, at the actuator-side end of the closure element, i.e., at the end facing the actuator device, there is provided an inclined guide surface for this purpose in which the transfer member can engage to rotate the closure element. Accordingly, the guide surface constitutes an engagement point of the closure element for the transfer member.

The inclined guide surface is inclined with respect to the longitudinal axis of the airbag venting device, in particular the housing. The inclined guide surface may also be configured in a groove-shaped segment of the actuator-side end of the closure element into which for example a transfer member designed as a pin element or comprising a pin element engages.

The transfer member may be continuously in contact with the actuator device or may be indirectly actuated by the actuator device.

The transfer member is preferably maintained, after activation of the actuator device, in the position in which the closure element is in its open position. Thus, the active pressure reduction inside the airbag is ensured.

In another embodiment, an airbag is provided comprising an airbag opening which is fastened, especially congruently, on one of the two flow orifices by a retaining ring circumferentially enclosing the corresponding flow orifice, in particular in a gastight/airtight manner. The retaining ring may be fastened to the housing via welding studs, for example.

Alternatively, the retaining ring may be fastened to the housing by clamps, such as Oetiker clamps including press-fit bolts or tube clamps.

Preferably, the airbag is attached to the flow orifice on which also the closure element is arranged. Thus, upon activation of the airbag and the accompanying abrupt gas expansion, the "dead space" in the housing of the airbag venting device need not be additionally filled with gas.

Another embodiment provides the actuator device to be configured electrically, especially using an electric motor as actuator, or pyrotechnically, especially using a pyrotechnic igniter as actuator. The pyrotechnic igniter may be a micro gas generator, for example.

An electric motor can help adapt a degree of opening of the closure element and thus the internal pressure of the airbag to the prevailing conditions (impact or vehicle occupant characteristics), in particular in a multi-stage or even infinitely variable manner. In addition, no particles are released upon activation.

When using a pyrotechnic igniter, the mechanical connection between the actuator device and the closure element or the transfer member may be dropped. Accordingly, the airbag venting device can be designed to be more compact and simpler, thereby reducing the manufacturing costs.

Further, the object is achieved by a vehicle seat comprising an airbag venting device, with the airbag venting device being integrated in the vehicle seat. In particular, the airbag venting device is mounted on a frame of the vehicle seat so that the position of the airbag venting device is fixed.

The afore-described advantages and characteristics of the airbag venting device according to the invention are equally applicable to the vehicle seat and vice versa.

Further advantages and characteristics of the invention will be evident from the following description and the drawings which are referred to, and wherein:

DESCRIPTION

Figure 1:
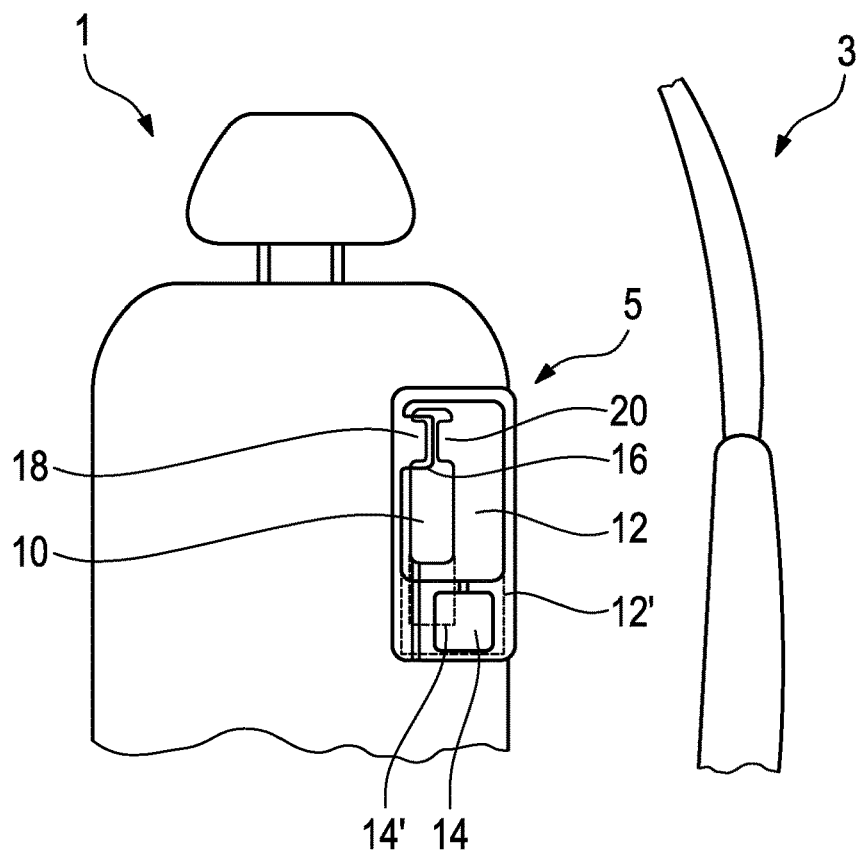
FIG. 1 shows a schematic sectional view of a vehicle occupant safety system comprising an airbag venting device according to the invention.

FIG. 1 illustrates a schematic sectional view of a vehicle seat 1 and a vehicle body 3. A vehicle occupant safety system 5 is disposed in a lateral area of the vehicle seat 1. The vehicle occupant safety system 5 comprises an airbag venting device 10, an airbag 12 shown merely schematically here and a gas generator 14. The broken line indicates an alternative preferred arrangement of the gas generator 14' as well as of the airbag 12' in which the airbag venting device 10 is disposed at a front end of the gas generator 14'. In such embodiment, the airbag venting device 10 and the gas generator 14' are configured especially in one piece and are disposed in the installed state in the airbag 12'.

The airbag 12 is fluidically connected to the gas generator 14 that inflates the airbag 12 in the event of crash. Accordingly, the airbag 12 deploys from the vehicle seat 1, for example, into an area between the vehicle seat 1 and the vehicle body 3. It is also imaginable for the airbag 12 to inflate between two vehicle seats, i.e., between the driver seat and the passenger seat, for example.

The airbag 12 is mounted to the airbag venting device 10 so that an airbag opening 16 interacts with a first flow orifice 18 of the airbag venting device 10.

The first flow orifice 18 faces away from the airbag 12, with a second flow orifice 20 facing the airbag 12 and being provided inside the airbag 12.

The airbag venting device 10 thus can be accommodated at least partially in the airbag 12.

The two flow orifices 18, 20 are substantially opposed to each other. That means that the two flow orifices 18, 20 may be provided on opposed or opposite sides of the airbag venting device 10.

In each case, a flow path communicating the inner volume of the airbag 12 with the environment can be established via the two flow orifices 18, 20.

A closure element 22 is assigned to at least one of the flow orifices 18, 20 to temporarily close at least one of the two flow orifices 18, 20 and, resp., to appropriately block the flow path.

For reasons of clarity, the closure element 22 is not shown here. In the following (FIGS. 3 to 16) it will be discussed in detail.

It is the purpose of the airbag venting device 10 to actively control an internal pressure of the inflated airbag 12. Depending on the required airbag characteristics (hard or soft), the closure element 22 is moved away from the flow orifices 18, 20, thereby exposing the flow path and, resp., the passage between the two flow orifices 18, 20. The exposed passage and, resp., the established flow path allows gas to escape from the airbag 12 and, thus, allows the internal pressure of the airbag 12 to be reduced.

Figure 2:
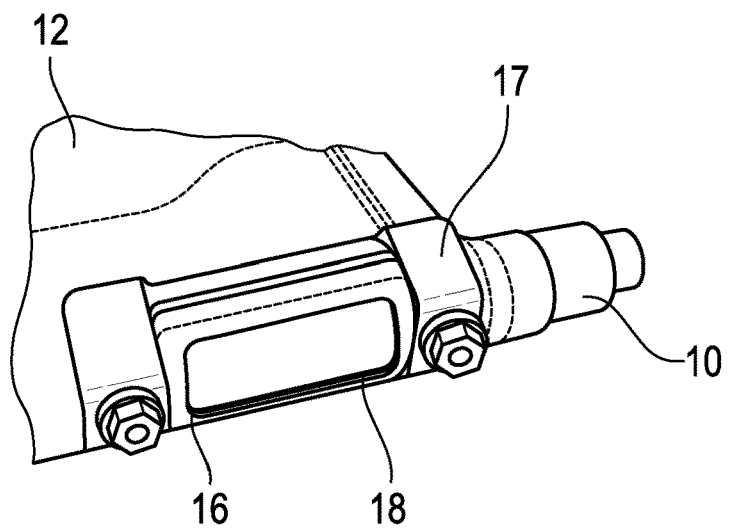
FIG. 2 shows a detailed view of a connecting point of an airbag to the airbag venting device according to the invention.

FIG. 2 shows in detail a possible arrangement of the airbag 12 on an airbag venting device 10 in which the airbag venting device 10 is accommodated only partially in the airbag 12.

A retaining ring 17 is fastened to the airbag venting device 10 such that it clamps the airbag 12 between itself and the airbag venting device 10 while circumferentially enclosing the airbag opening 16 and the first flow orifice 18.

Optionally, the airbag 12 is connected to the airbag venting device 10 in a gastight/airtight manner.

In the embodiment shown here, the retaining ring 17 is attached to the airbag venting device 10 via a screw-and-nut connection. The screw-and-nut connection can moreover be utilized for fastening to an airbag module housing.

Alternatively, the retaining ring 17 can also be fastened to the airbag venting device 10 by Oetiker clamps having press-fit bolts or tube clamps.

Figure 3:
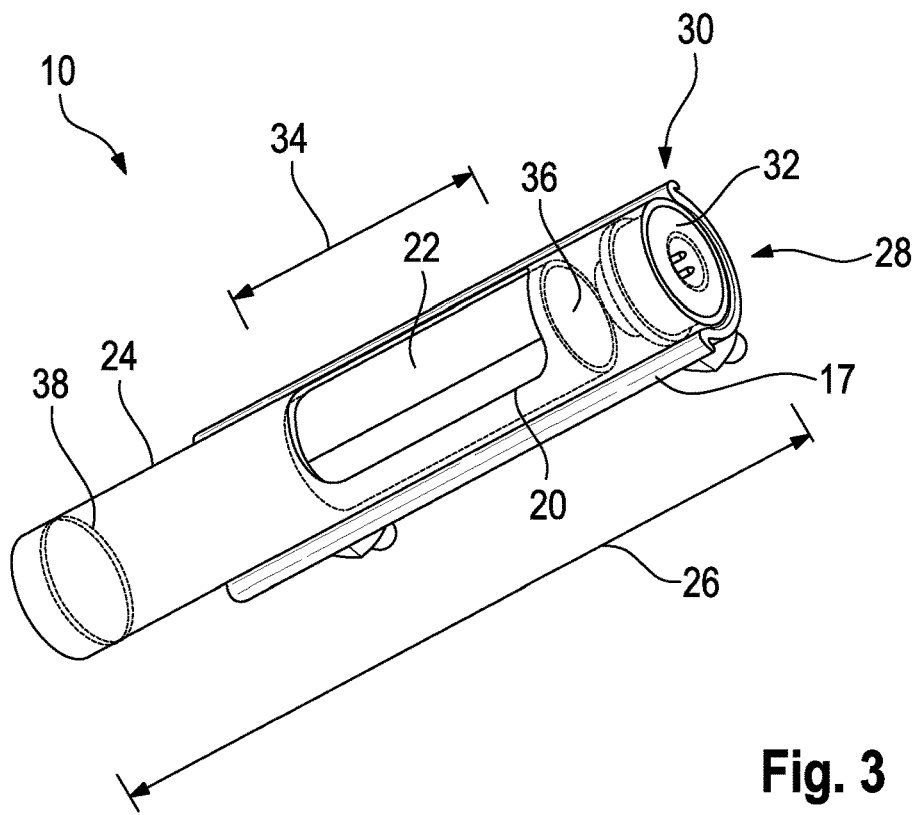
FIG. 3 shows a first embodiment of the airbag venting device according to the invention in a closing position.
Figure 4:
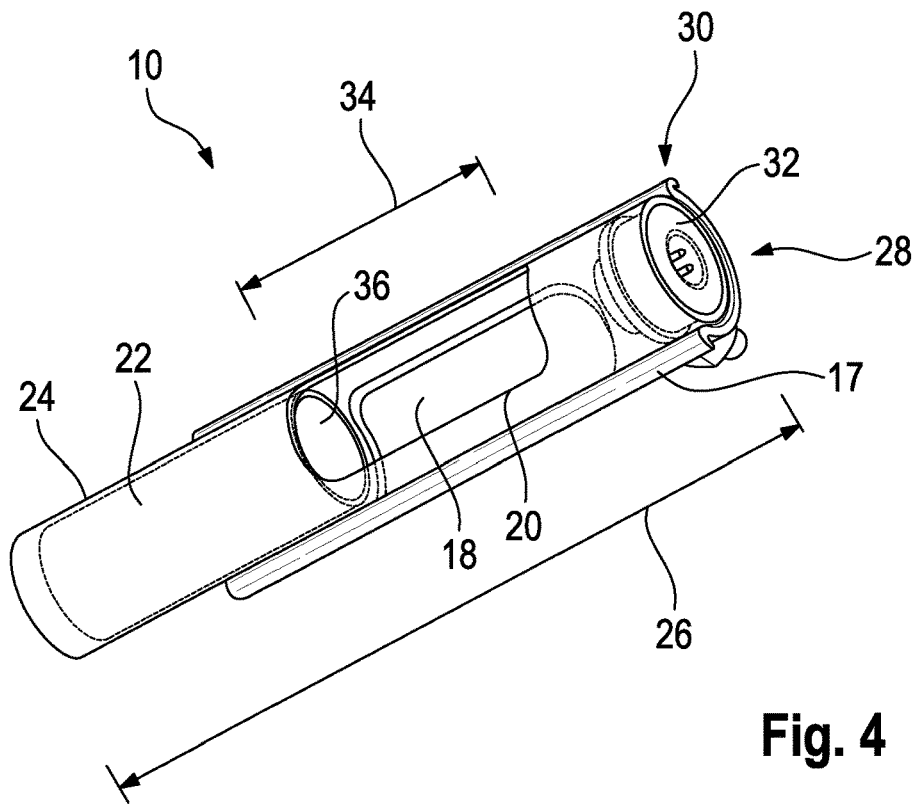
FIG. 4 shows the first embodiment of the airbag venting device according to the invention in accordance with FIG. 3 in an open position.

In FIG. 3 and FIG. 4, a first embodiment of the airbag venting device 10 is shown in a closing position and, resp., an open position. In this embodiment, the airbag venting device 10 comprises a circular-cylindrical housing 24 having an axial total length 26.

An actuator device 30 including at least one actuator 32 is disposed at a front end 28 of the housing 24.

In the embodiment shown here, the actuator 32 comprises a pyrotechnic igniter in the form of a micro gas generator, for example.

The actuator device 30 may be accommodated partially or completely in the housing 24.

On the housing 24, the two flow orifices 18, 20 each of which has an axial opening length 34 are provided to be congruent and opposite to each other (see FIG. 4). This means that the two flow orifices 18, 20 take the same shape and, consequently, have the same axial opening length 34.

The total length 26 of the housing 24 and, thus, also that of the airbag venting device 10 is significantly shorter than 3 times the opening length 34.

In particular, the total length 26 is maximum 2.5 times the opening length 34.

It is advantageous for the two flow orifices 18, 20 to be equally shaped and opposite to each other, as thus flow resistances of a gas flow can be reduced in the flow path between the two flow orifices 18, 20.

As an alternative, the flow orifices 18, 20 may be offset against each other or oriented differently to each other. The gas flow can be directed in this way.

The retaining ring 17 is fastened to the housing 24 around the first flow orifice 18. The airbag 12 (not shown) is clamped between the retaining ring 17 and the housing 24 in a gastight/airtight manner.

The closure element 22 is accommodated in the housing 24.

In this embodiment, the closure element 22 is a hollow (substantially) circular-cylindrical piston that is supported to be axially movable inside the equally (substantially) circular-cylindrical housing 24.

The closure element 22 includes, on a front end assigned to the actuator device 30, a piston opening 26 via which a fluid communication into the cavity of the closure element 22 is established.

In an initial position, i.e., when the actuator device 30 is not activated, the closure element 22 is in its closing position (see FIG. 3). In the shown embodiment, the closure element 22 simultaneously closes both flow orifices 18, 20.

When the airbag 12 is inflated by the gas generator 14, no (or only little) gas may escape from the airbag 12 via the flow orifices 18, 20, as the flow orifices 18, 20 are blocked. Consequently, the internal pressure inside the airbag 12 remains almost constant.

If the internal pressure of the airbag 12 is to be reduced, the actuator device 30 is actuated. In the case contemplated here, the actuator 32 configured as a pyrotechnic igniter ignites, thus causing the gas between the actuator device 30 and the closure element 22 to abruptly expand. The expanding gas enters through the piston opening 36 into the hollow of the closure element 22 configured as hollow piston and causes the closure element 22 to be axially displaced in the direction of its open position.

The particles possibly released upon ignition of the actuator 32 are largely received in the hollow area of the closure element 22, i.e., in the cavity.

In an end position, the closure element 22 is in its open position (cf. FIG. 4). Accordingly, both flow orifices 18, 20 are exposed so that gas may escape from the airbag 12 through the flow orifices 18, 20 and, thus, the internal pressure of the airbag 12 may be reduced.

The housing 24 may be constricted (e.g., by a roller-burnishing 38) in an area into which the closure element 22 is moved to its open position, or may have a component by which the closure element 22 is held in its open position.

Break components which reliably maintain the closure element 22 in its closing position and do not release the closing member 22 before actuation of the actuator device 30 and an accompanying intended movement of the closure element 22 may be assigned to the closure element 22. As an alternative, also further retaining members can be utilized to reliably maintain the closure element 22 in its closing position, said retaining members being configured, e.g., to be adhesive such as adhesive points, or to be positive such as via locking elements or a roller-burnishing, and do not enable the closure element 22 to be released before the actuation of the actuator device 30.

The housing 24 may also take a different shape such as a rectangular shape. Components which are influenced by the shape of the housing 24, such as the closure element 22, the actuator device 30 and the like, can be appropriately adapted.

Figure 5:
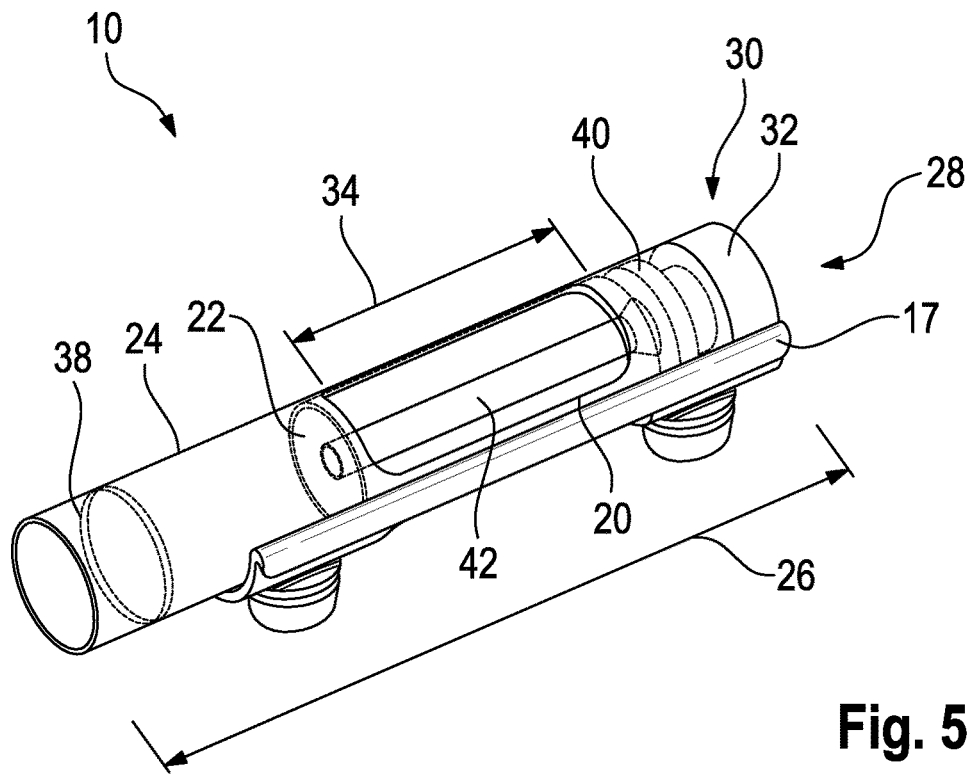
FIG. 5 shows a second embodiment of the airbag venting device according to the invention in a closing position.
Figure 6:
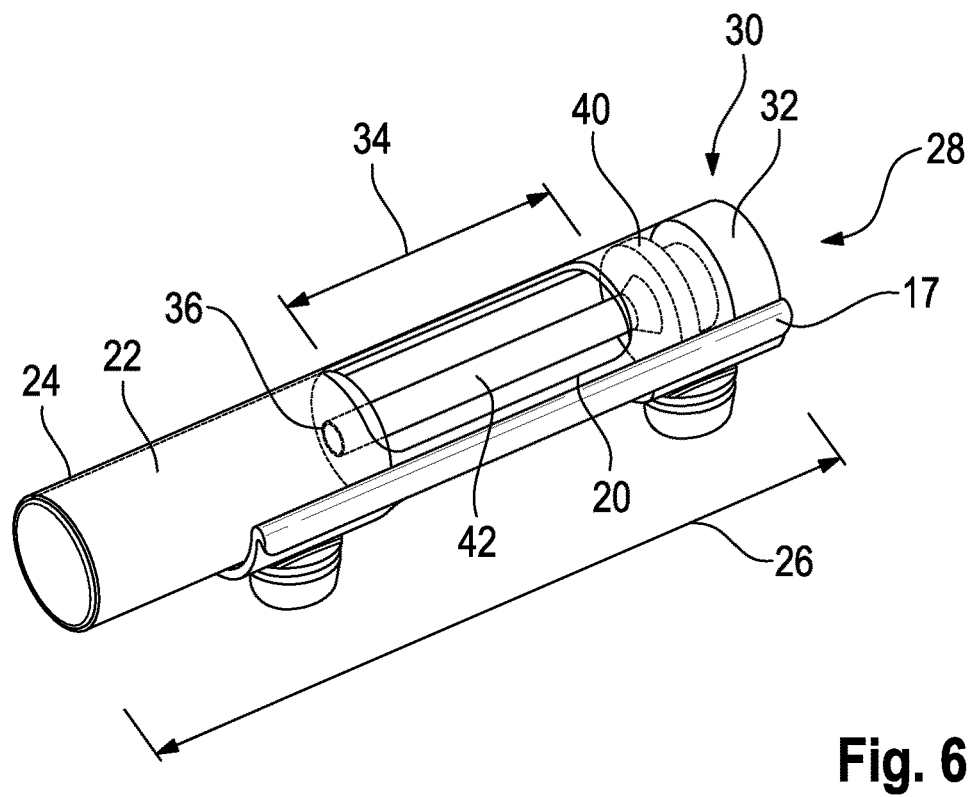
FIG. 6 shows the second embodiment of the airbag venting device according to the invention in accordance with FIG. 5 in an open position.

FIGS. 5 and 6 show a second embodiment of the airbag venting device 10 in a closing position and, resp., an open position. The second embodiment resembles the afore-described first embodiment. Like reference numerals are used for the parts known from the first embodiment. In this respect, the foregoing explanations are referred to.

The difference between the two embodiments consists in the fact that, in the second embodiment, a transfer member 40 is provided between the actuator device 30 and the closure element 22.

The transfer member 40 is tightly connected to the actuator device 30 or the actuator 32 and/or the housing 24.

A funnel-shaped channel 42 is formed integrally with the transfer member 40 so as to protrude through the piston opening 36 into the closure element 22 configured as a hollow piston.

The funnel-shaped channel 42 is preferably dimensioned so that it also protrudes into the closure element 22, if the latter is in its open position (see FIG. 6). As an alternative, the funnel-shaped channel 42 may also be dimensioned so that it does not protrude into the closure element 22, if the latter is in its open position.

In particular, the connections between the actuator device 30 and the transfer member 40 are gastight/airtight. Also, the transfer member 30 may protrude into the closure element 22 in a gastight/airtight manner. For example, the closure element 22 has an end plate through which the transfer member 40 protrudes into the cavity so that the cavity is sealed.

In this way, the particles released upon ignition of the actuator 32 are received in the transfer member 40 and in the hollow area of the closure element 22.

Moreover, almost the entire force generated by the actuator device 30 can be directed specifically into the closure element 22.

The opening mechanism is identical to that of the afore-described first embodiment.

As, due to the transfer member 40, the pressure formed by the ignition of the actuator 32 decreases relatively slowly only, the closure element 22 is pressurized with pressurized gas and/or compressed air for a longer period of time. In addition, thus preferably a smaller and less powerful pyrotechnic igniter can be utilized.

Figure 7:
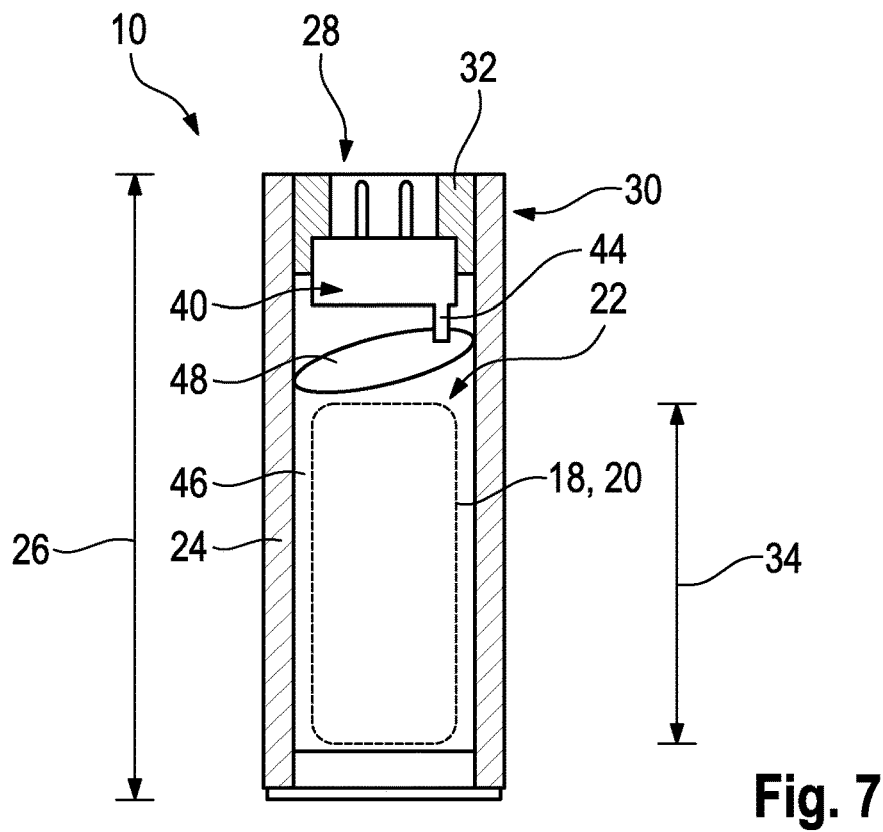
FIG. 7 shows a third embodiment of the airbag venting device according to the invention in a closing position.
Figure 8:
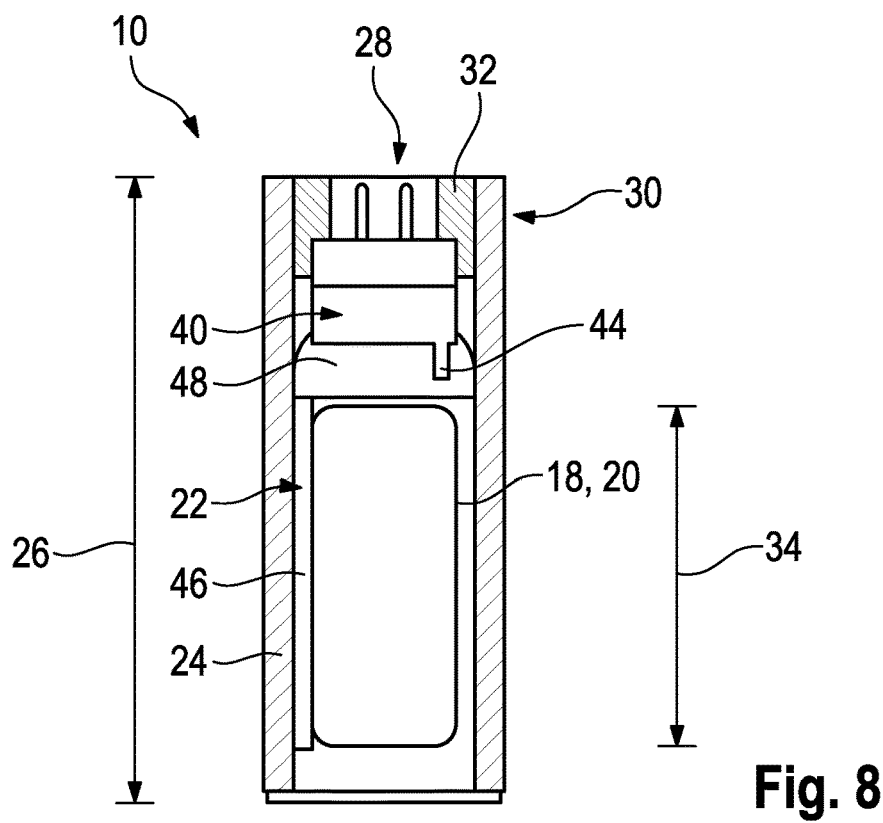
FIG. 8 shows the third embodiment of the airbag venting device according to the invention in accordance with FIG. 7 in an open position.

FIG. 7 and FIG. 8 illustrate a third embodiment of the airbag venting device 10 in a closing position and, resp., an open position. Like reference numerals are used for the parts known from the first and second embodiments. In this respect, the foregoing explanations are referred to.

In this embodiment, the actuator 32 is an electric motor on which the transfer member 40 is arranged, especially mechanically mounted.

A guiding extension 44 projecting in the direction of the closure element 22 is formed integrally with the transfer member 40 to interact with the closure element 22.

Optionally, the closure element 22 may also be connected directly to the actuator 32.

In each of FIGS. 7 and 8, only one of the two flow orifices 18, 20 is illustrated.

The closure element 22 in this case comprises a curved closure portion 46 configured to be plate-shaped, for example. The closure portion 46 includes an inclined guide surface 48 on its end face facing the actuator device 30.

The closure element 22 is rotatably received in the housing 24 so that the closure element 22 may rotate inside the housing 24 when the actuator device 30 has been activated.

In an initial position, the closure element 22 is in its closing position (see FIG. 7). Accordingly, the closure element 22 closes at least one of the two flow orifices 18, 20.

Upon actuation of the actuator device 30, the actuator 32 configured as electric motor in the case contemplated here initiates an axial movement of the transfer member 40 in the direction of the closure element 22. In doing so, the guide extension 44 of the transfer member 40 impinges on the inclined guide surface 48 of the closure element 22 and, thus, causes the closure portion 46 to rotate in the circumferential direction along the inner face of the housing 24. The closure element 22 is rotated by approx. 90° about its own axis into its open position. The axial movement of the transfer member 40 in the direction of the closure element 22 may alternatively be caused by an actuator 32 in the form of a pyrotechnic igniter (not shown).

If the closure element 22 is directly connected to the electric motor or actuator 32, the electric motor or the actuator 32 can also move the closure element 22, for example infinitely variably, into different intermediate positions/partial open positions. Hence, the gas flow between the flow orifices 18, 20 and, consequently, the internal pressure of the airbag 12 can be adjusted more precisely.

In an end position, the closure element 22 is present in its open position (see FIG. 8). Accordingly, both flow orifices 18, 20 are exposed.

Since the closure element 22 rotates about its own axis in the circumferential direction along the inner face of the housing 24 into its open position, no additional installation space is required for accommodating the closure element 22 in its open position, as this is the case, for example, in the first and second embodiments (see FIGS. 3 to 6). As a consequence, installation space can be saved.

In this way, the total length 26 in the embodiment described here is even less than 2 times the opening length 34.

Particularly, the total length 26 is less than 1.5 times the opening length 34.

In this embodiment, the closure element 22 is maintained in its open position by the electric motor of the actuator 32.

Alternatively, components or mechanisms by which the closure element 22 is maintained in its closing position or its open position before and/or after actuation of the actuator device 30 may be provided on the housing 24 or on the closure element 22.

Figure 9:
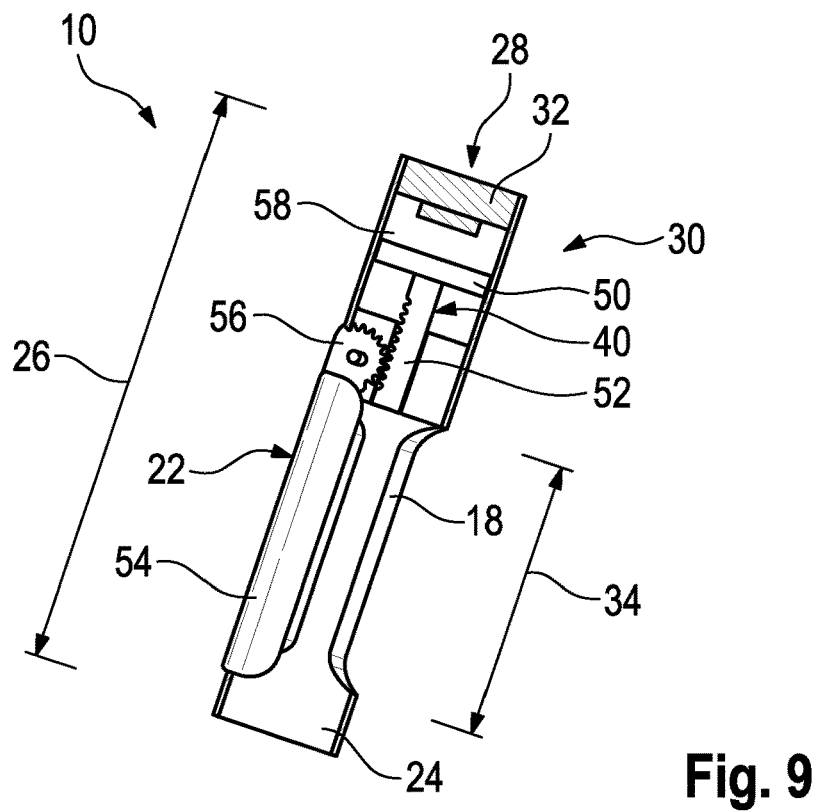
FIG. 9 shows a fourth embodiment of the airbag venting device according to the invention in a closing position.
Figure 10:
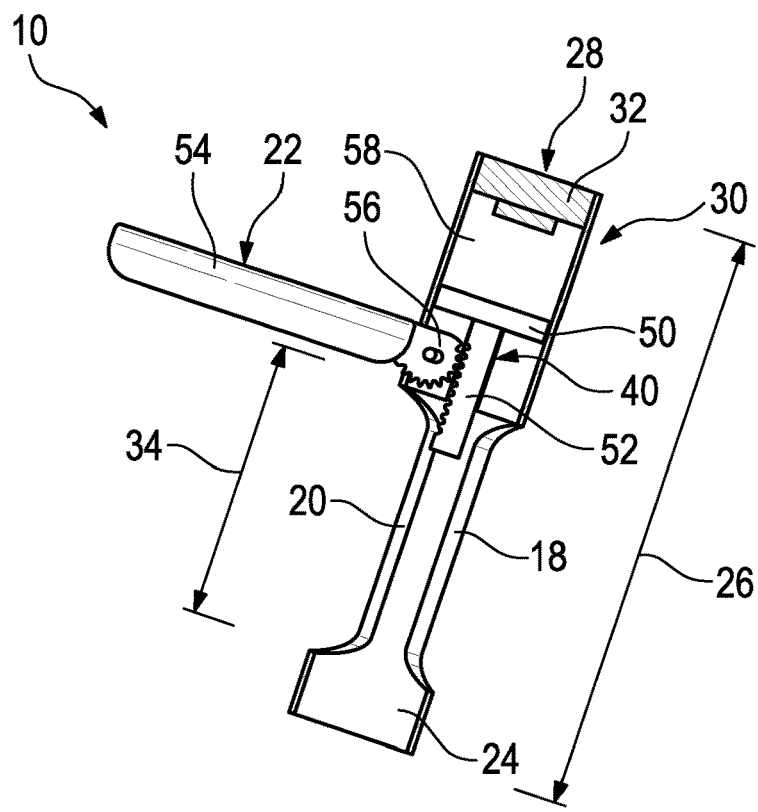
FIG. 10 shows the fourth embodiment of the airbag venting device according to the invention in accordance with FIG. 9 in an open position.

FIG. 9 and FIG. 10 illustrate a fourth embodiment of the airbag venting device 10 in a closing position and, resp., open position. Like reference numerals are used for the parts known from the afore-described embodiments, and in this respect the foregoing explanations are referred to.

In this embodiment, the actuator 32 is a pyrotechnic igniter.

Alternatively, the actuator 32 may also be an electric motor that is directly connected to the transfer member 40. The transfer member 40 may be in the form of a worm of a worm gear (not shown) or may comprise an extension 52 having a toothing.

The transfer member 40 is arranged to be spaced from the actuator device 30 and at least partially in a pressure chamber 58 and comprises a pressure plate 50 formed integrally with a toothed extension 52 that projects in the direction of the closure element 22. Accordingly, the extension 22 includes a toothing.

The closure element 22 comprises a curved closure portion 54 that includes, on its end face facing the actuator device 30 a toothed transfer component 56, i.e., a mating toothing.

The closure element 22 is pivotally arranged on the housing 24. The pivot bearing is provided with respect to the housing 24 such that the closure element 22 pivots outwards, i.e., away from the housing 24.

In an initial position, the closure element 22 is in its closing position (cf. FIG. 9). Thereby, the closure element 22 closes either of the two flow orifices 18, 20 from outside.

It is of advantage to provide the closure element 22 at the flow orifice 20 that faces the airbag 12 or is disposed in the airbag 12. On the one hand, in an inflated airbag 12 the internal pressure of the airbag 12 acts on the closure element 22 so that it is forced against the flow orifice 20 and, thus, more strongly closes, viz. seals, the flow orifice 20. On the other hand, the inflated airbag 12 offers sufficient space to open the closure element 22, i.e., to pivot the latter into the inflated airbag 12.

Upon ignition of the actuator 32, the expanding gas causes the transfer member 40 to be abruptly moved axially away from the actuator device 30. The axial displacement of the toothed extension 52 of the transfer member 40 is transferred over the toothed transfer component 56 of the closure element 22 into a pivoting movement of the closure portion 54 of the closure element 22.

In other words, the toothing and, resp., the toothed extension 52 as well as the mating toothing, i.e., the toothed transfer component 56, provide a translation for translating the axial movement of the transfer member 40 into the rotary movement, in particular pivoting movement, of the closure element 22.

Since the pressure formed by ignition of the actuator 32 decreases only relatively slowly in the pressure chamber 58, the transfer member 40 is pressurized with pressurized gas and/or compressed air for a longer period of time.

The particles released upon ignition of the actuator 32 are maintained in the pressure chamber 58, as the latter is sealed by the pressure plate 50. Thus, any particles are safely prevented from exiting via the flow orifices 18, 20.

In the embodiment comprising an electric motor as actuator 32, the electric motor initiates the abrupt axial displacement of the transfer member 40 and the accompanying pivoting movement of the closure element 22.

In doing so, the closure element 22 is maintained in its open position by the electric motor of the actuator 32.

In an end position, the closure element 22 is provided in its open position (see FIG. 10). Accordingly, both flow orifices 18, 20 are exposed.

Analogously to the third embodiment (FIGS. 7 and 8), also in this embodiment no additional installation space is required for accommodating the closure element 22 in its open position, whereby installation space can be saved.

Consequently, the total length 26 in the embodiment described here is less than 2 times the opening length 34.

In particular, the total length 26 is less than 1.5 times the opening length 34.

In this embodiment, the closure element 22 is maintained in its open position by the pressure in the pressure chamber 58 or the electric motor of the actuator 32.

As an alternative, components or mechanisms by which the closure element 22 is maintained in its closing position or its open position before and/or after actuation of the actuator device 30 may be provided on the housing 24, on the transfer member 40 or on the closure element 22.

The housing 24 may also take a different shape such as a rectangular shape.

Components which are influenced by the shape of the housing 24, such as the closure element 22, the transfer member 40, the actuator device 30 and the like, may be appropriately adapted.

Figure 11:
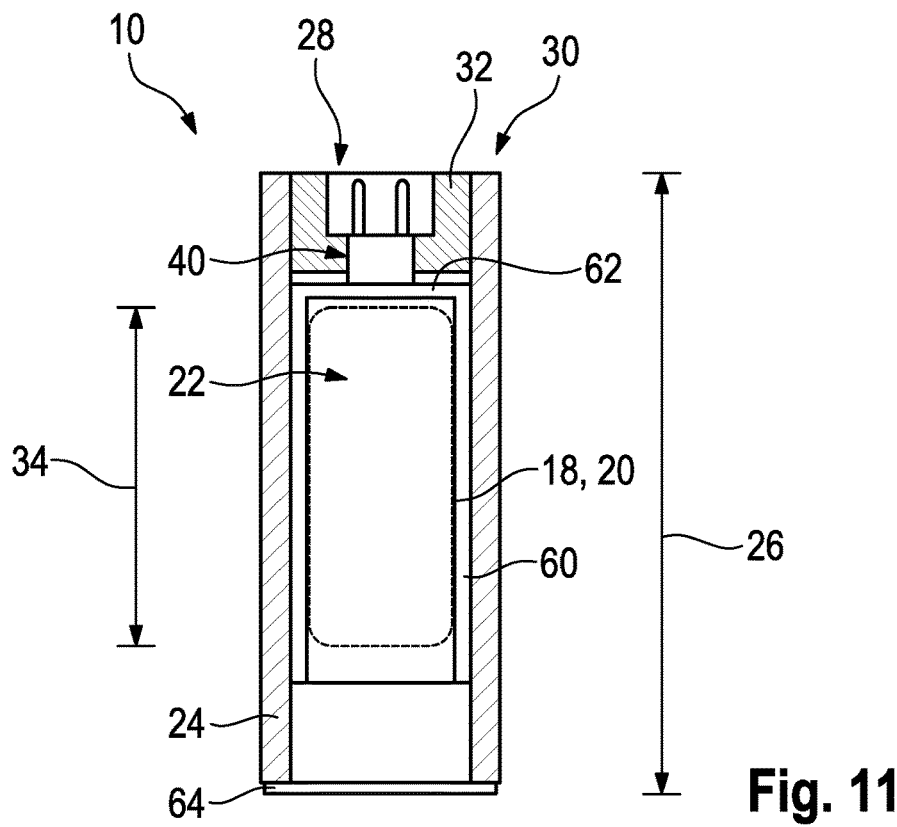
FIG. 11 shows a fifth embodiment of the airbag venting device according to the invention in a closing position.
Figure 12:
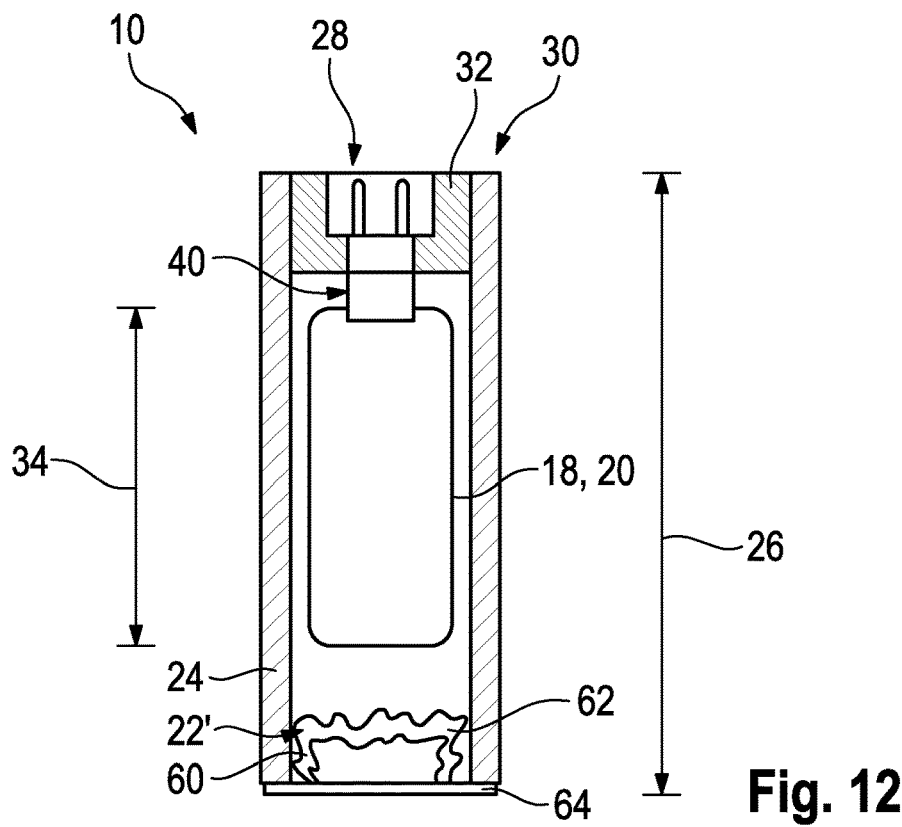
FIG. 12 shows the fifth embodiment of the airbag venting device according to the invention in accordance with FIG. 11 in an open position.

In FIGS. 11 and 12, a fifth embodiment of the airbag venting device 10 is shown in a closing position and, resp., an open position. Like reference numerals are used for the parts known from the afore-described embodiments, and in this respect the foregoing explanations are referred to.

The airbag venting device 10 in this embodiment comprises a mechanical actuator device 32.

The closure element 22 in this embodiment is a hollow (substantially) circular-cylindrical piston that is supported to be axially movable in the equally (substantially) circular-cylindrical housing 24.

The closure element 22 includes a closed front end 62 assigned to the actuator device 30 on which the transfer member 40 in this embodiment abuts in the closing position (see FIG. 11).

Activation of the actuator device causes the transfer member 40 to be moved away from the actuator 32 in the axial direction and thus to exert a pulse and, resp., a force upon the closure element, thereby the latter moving in the direction of the front wall 64 of the housing 24 opposite to the front end 28 in which the actuator device is received.

The closure element 22, in particular the cylinder wall 60, is configured to be at least partially deformable and/or compressible so that the closure element 22 can be compressed and collapsed at the front wall 64 (see FIG. 12).

Thus, the total length 26 in the embodiment described here is less than 2 times the opening length 34. In particular, the total length 26 is less than 1.5 times the opening length 34.

FIGS. 13 to 16 illustrate a sixth embodiment of the airbag venting device 10 and of an airbag 12 (FIGS. 14 and 16) in a closing position and, resp., open position in different views. Like reference numerals are used for the parts known from the afore-described embodiments, and in this respect the foregoing explanations are referred to.

The actuator 32 in this embodiment is an electric motor, particularly a servo motor or step motor.

The closure element 22 here comprises a bent closure portion 46 that is plate-shaped, for example. The closure portion 46 is connected to the transfer member 40 via connecting elements 47.

The closure element 22 is rotatably accommodated in the housing 24 so that the closure element 22 may rotate inside the housing 24, if the actuator device 30 has been activated.

Figure 13:
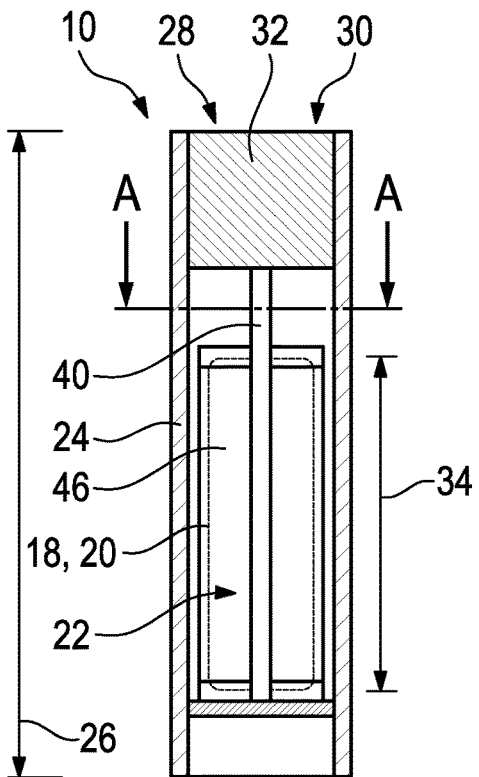
FIG. 13 shows a sixth embodiment of the airbag venting device according to the invention in a closing position in a sectional view according to the line B-B in FIG. 14.
Figure 14:
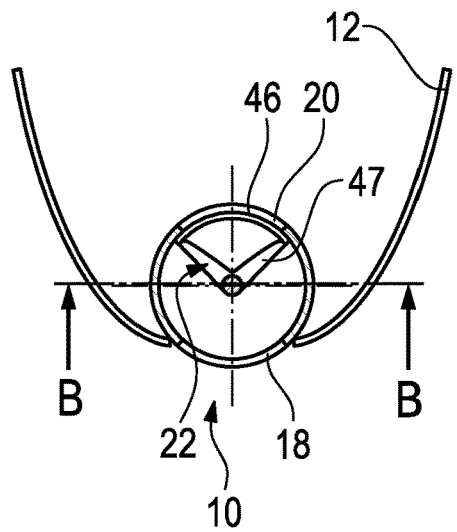
FIG. 14 shows a sectional view of the sixth embodiment of the airbag venting device according to the invention in the closing position according to the line A-A in FIG. 13.

In an initial position, the closure element 22 is provided in its closing position (see FIGS. 13 and 14). Thereby, the closure element 22 closes at least one of the two flow orifices 18, 20.

Upon activation of the actuator device 30, the actuator 32 configured as electric motor in the case contemplated here initiates a rotary movement of the transfer member 40 and, thus, also a rotation of the closure portion 46 in the circumferential direction along the inner face of the housing 24. In doing so, the closure element 22 is rotated by approx. 90° about its own axis to reach the open position shown in FIGS. 15 and 16.

Such embodiment especially also enables the flow orifices 18, 20 to be opened in previously defined steps. For example, at particular times after activation of the actuator device 30, depending of occupant-dependent and/or crash-dependent parameters, particular partial open positions may be provided to be enabled, such as, for example, a rotation of the closure element 22 of 5° at 5 msec and 45° at 25 msec. Those time-dependent partial open positions are preferably stored in a control unit (not shown) in the form of a matrix in which partial open positions at particular times are assigned to occupant-dependent and/or crash-dependent parameters. In addition, such actuator device 30 also enables the closure element 22 to be transferred to the closed position again so that the flow orifices 18, 20 can be completely closed again.

Moreover, the closure element 22 connected directly to the electric motor or, resp., actuator 32 via the transfer member 40 can be moved, especially infinitely variably, to different intermediate positions/partial open positions by the electric motor or, resp., the actuator 32. In this way, the gas flow between the flow orifices 18, 20 and, thus, the internal pressure of the airbag 12 can be adjusted more precisely.

Figure 15:
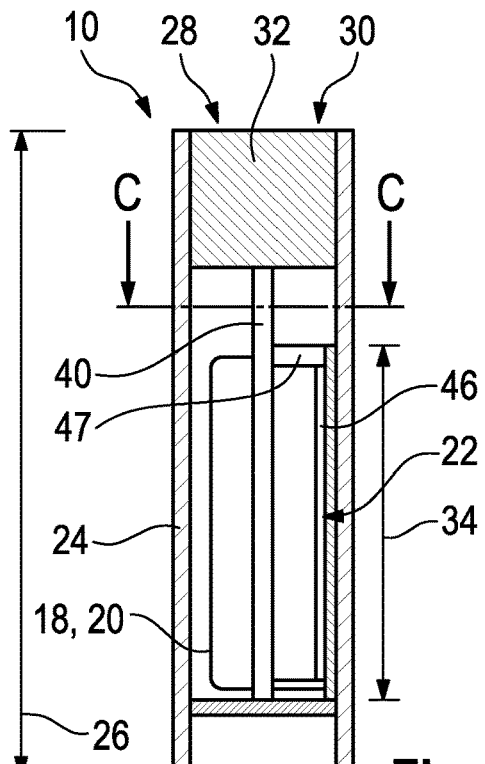
FIG. 15 shows the sixth embodiment of the airbag venting device according to the invention in an open position in a sectional view according to the line D-D in FIG. 16.
Figure 16:
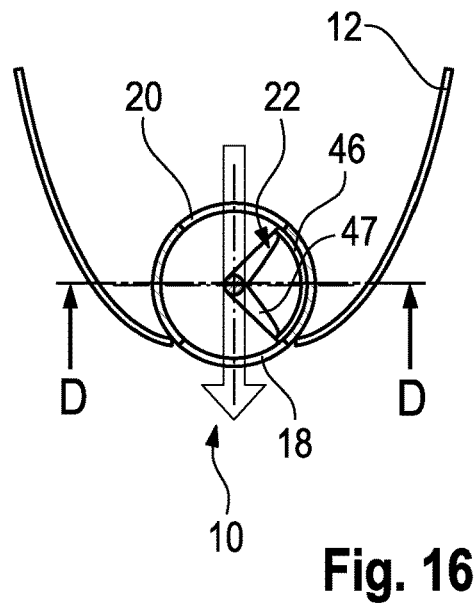
FIG. 16 shows a sectional view of the sixth embodiment of the airbag venting device according to the invention in the open position according to the line C-C in FIG. 15.

In an end position, the closure element 22 is provided in its open position (see FIGS. 15 and 16). Accordingly, both flow orifices 18, 20 are exposed.

Since the closure element 22 rotates about its own axis in the circumferential direction along the inner face of the housing 24 into its open position, no additional installation space is required in which the closure element 22 must be received in its open position.

In this way, the total length 26 in the embodiment described here is even smaller than 2 times the opening length 34. In particular, the total length 26 is less than 1.5 times the opening length 34.

The invention claimed is:

1. An airbag venting device for controlling an internal pressure of an airbag of a vehicle occupant safety system by releasing inflation gas generated by a gas generator, comprising
   a housing including a first flow orifice facing away from the airbag and a second flow orifice facing the airbag, the housing having an axial total length, the first flow orifice having a first axial opening length and the second flow orifice having a second axial opening length,
   an adjustable closure element assigned to the housing, the closure element, in a closing position, closing and, in an open position, releasing at least one of the first and second flow orifices,
   an actuator device provided at a front end of the housing, the actuator device being configured for activation via a signal received from a controller,
   wherein the actuator device interacts with the closure element to release and/or to close at least one of the first and second flow orifices,
   and wherein the axial total length of the housing is less than 3 times the length of the longer axial opening length of the first and second flow orifices.

2. The airbag venting device according to claim 1, wherein the first and second flow orifices are opposed, at least congruently, to each other.

3. The airbag venting device according to claim 1, wherein the actuator device and the closure element interact so that the closure element rotates and/or axially adjusts based on an activation of the actuator device.

4. The airbag venting device according to claim 1, wherein the actuator device comprises a transfer member which interacts with the closure element and/or through which the actuator device is at least partially in mechanical contact with the closure element, in particular protrudes at least partially into the closure element.

5. The airbag venting device according to claim 4, wherein the closure element is a hollow, particularly cylindrical, piston that is supported to be axially movable in the housing and/or includes a piston opening on an end face assigned to the actuator device.

6. The airbag venting device according to claim 5, wherein the transfer member comprises a funnel-shaped channel protruding through the piston opening into the piston.

7. The airbag venting device according to claim 6, wherein the closure element is pivotally attached to the outside of the housing, wherein the closure element in the open position is folded away from the housing to release at least one of the first and second flow orifices.

8. The airbag venting device according to claim 7, wherein the transfer member comprises a toothing which interacts with a mating toothing of the closure element so that an axial movement of the transfer member causes a pivoting movement of the closure element.

9. The airbag venting device according to claim 1, wherein the closure element is curved and is rotatably supported inside or outside the housing.

10. The airbag venting device according to claim 9, wherein a guiding extension projects, on the transfer member, in the direction of the closure element, the guiding extension interacting with the closure element so that an axial movement of the transfer member effectuates a rotary movement of the closure element.

11. The airbag venting device according to claim 1, wherein the closure element is a hollow, especially cylindrical, piston which is supported to be axially movable in the housing and includes a closed end face assigned to the actuator device, wherein at least one cylinder wall of the piston is configured to be deformable and/or compressible.

12. The airbag venting device according to claim 4, wherein the transfer member comprises a push rod.

13. The airbag venting device according to claim 1, wherein the actuator device is configured to be electric, in particular comprising an electric motor as actuator, or to be pyrotechnic, in particular comprising a pyrotechnic igniter as actuator.

14. An airbag comprising an airbag venting device according to claim 1, wherein an airbag opening is provided which is mounted, especially in a gastight/airtight manner, on at least one of the first and second flow orifices of the airbag venting device, especially congruently, by a retaining ring circumferentially enclosing the respective flow orifice.

15. A vehicle seat comprising an airbag venting device according to claim 1, wherein the airbag venting device is integrated in the vehicle seat.

16. The airbag venting device according to claim 1, wherein the housing comprises an axially extending cylindrical sidewall and the first and second flow orifices comprise openings in the cylindrical sidewall.

17. The airbag venting device according to claim 16, wherein the closure element is positioned within the cylindrical sidewall and has a curved configuration configured to mate a cylindrical inner surface of the housing.

18. The airbag venting device according to claim 17, wherein the closure element is configured to move between the closing position and the open position through at least one of axial and rotational movement.

19. A vehicle occupant safety system comprising:
   an airbag;
   a gas generator configured to generate gas for inflating the airbag; and
   the airbag venting device according to claim 1.

* * * * *